United States Patent [19]

Muscatello et al.

[11] Patent Number: 4,683,124

[45] Date of Patent: Jul. 28, 1987

[54] ACTINIDE RECOVERY PROCESS

[75] Inventors: Anthony C. Muscatello; James D. Navratil; Mark T. Saba, all of Arvada, Colo.

[73] Assignee: The United States of America as represented by the United States Department of Energy, Washington, D.C.

[21] Appl. No.: 744,441

[22] Filed: Jun. 13, 1985

[51] Int. Cl.$^4$ .............................................. C01G 56/00
[52] U.S. Cl. ........................................ 423/6; 423/7; 423/8; 423/9; 423/10; 423/251
[58] Field of Search ................... 423/6, 7, 8, 9, 10, 423/251

[56] References Cited

U.S. PATENT DOCUMENTS

| | | | |
|---|---|---|---|
| 3,183,059 | 5/1965 | Reisenauer et al. | 423/6 |
| 3,615,268 | 10/1971 | Moore | 423/7 |
| 4,011,296 | 3/1977 | Ruiz et al. | 423/10 |
| 4,305,912 | 12/1981 | Pyrih et al. | 423/10 |
| 4,316,776 | 2/1982 | Tallent | 423/3 |
| 4,402,917 | 9/1983 | Largman et al. | 423/10 |

OTHER PUBLICATIONS

A. Muscatello et al., Sep. Sci. and Tech., 18(14 and 15), pp. 1731–1746, 1983.

*Primary Examiner*—John F. Terapane
*Assistant Examiner*—Virginia B. Caress
*Attorney, Agent, or Firm*—Armand McMillan; Judson R. Hightower

[57] ABSTRACT

Process for the removal of plutonium polymer and ionic actinides from aqueous solutions by absorption onto a solid extractant loaded on a solid inert support such as polystyrenedivinylbenzene. The absorbed actinides can then be recovered by incineration, by stripping with organic solvents, or by acid digestion. Preferred solid extractants are trioctylphosphine oxide and octylphenyl-N,N-diisobutylcarbamoylmethylphosphine oxide and the like.

5 Claims, No Drawings

ACTINIDE RECOVERY PROCESS

The U.S. Government has rights in this invention pursuant to Contract No. DE-AC04-76DP03533 between the Department of Energy and Rockwell International Corporation.

BACKGROUND OF INVENTION

This invention relates to actinide recovery. More particularly, it relates to the removal of americium and all forms of plutonium from solutions such as plutonium scrap recovery nitric acid waste streams.

The separation of actinides from acid aqueous solutions, using a solvent sorbed onto a solid, is well known. Thus, Fuller discloses the extraction of uranium values from solution, using agglomerates of e.g., trioctylphosphine oxide (TOPO) and solid particles such as polystyrene, p-terphenyl, polyethylene, and the like (U.S. Pat. No. 4,406,865). Delvalle, also, has disclosed differential complex formation of uranium isotopes by phosphine oxides, etc., including TOPO (U.S. Pat. Nos. 4,012,480 and 4,237,100). Pyrih et al, in uranium recovery from phosphoric acid solutions, separate alkylphenylphosphate esters by adsorption on particles of polystyrene, followed by elution of said esters with methanol (U.S. Pat. No. 4,305,912). It is also known that plutonium polymers can be extracted by liquid bifunctional organophosphorus compounds such as dibutylphosphate (DBP) and dihexyl-N,N-diethylcarbamoylmethylphosphonate (DHDECMP), as disclosed and reviewed by Muscatello et al in Separation Science and Technology, 18 (14 & 15), pp. 1731-6 (1983), incorporated herein by reference. These are the only successful liquid-liquid plutonium polymer extractions known to applicants, through their own experience (with DHDECMP) or from the literature (DBP, published between 1956 and 1963. See reference 4 to 6 of the Muscatello et al paper, supra).

Yet, in the conventional handling of actinide solutions for recovery of their metal values, the formation of plutonium polymers is carefully avoided because of the difficulties involved in their separation from solution and their resistance, once formed, to conversion to more easily removable non-polymeric species. In practice, uranium polymer formation is prevented by working in acid medium. As a result of these circumstances, the problem of removing plutonium polymers from aqueous solution has not yet been specifically addressed.

It is therefore an object of this invention to provide a process for removal of actinides including all forms of plutonium from aqueous solutions.

Additional objects, advantages, and novel features of the invention will be set forth in the description that follows, and in part will become apparent to those skilled in the art upon examination of the following disclosure, or still may be learned by practice of the invention. The objects and advantages of the invention may be realized and attained by means of the instrumentalities and combinations particularly pointed out in the appended claims.

SUMMARY OF THE INVENTION

To achieve the objects of the invention and in accordance with its purpose as embodied and broadly described herein, there has now been devised a process for the separation of actinides, including plutonium polymers, which consists in selectively sorbing actinide values on a solid support such as styrenedivinylbenzene beads, polyurethane foam, porous glass beads, and the like, loaded with a solid solvent extractant, such as trioctylphosphine oxide (TOPO), octylphenyl-N,N-diisobuytlcarbamoylmethylphosphine oxide, and the like. After sorption, for instance in a column operated in the manner of an ion-exchange column, the loaded sorption material is removed from the column and is either incinerated or acid digested to recover the polymers and the other actinides. Conventional solvents may also be used to strip extractant and actinides from the support.

DETAILED DESCRIPTION OF THE INVENTION

Polymeric species of plutonium (IV) form in low acid conditions and lead to losses of plutonium in process streams. Plutonium polymer itself is a hydrolytic form of plutonium hydroxide which does not sorb on usual ion exchange resins nor can be extracted by standard solvents such as tributylphosphate (TBP).

It has now been found that plutonium polymer, as well as americium and other actinides, can be extracted by certain solid solvent extractants on solid supports. An actinide solution to be stripped of actinides is, for instance, passed through a column loaded with the extractant-support material and the actinide values are removed from the solution, as takes place in conventional ion-exchange columns. The solid solvent extractants that are used for this process are substances such as trioctylphosphine oxide (TOPO), octylphenyl-N,N-diisobutylcarbamoylmethylphosphine oxide [O0D-(iB)CMPO], triphenylphosphine oxide (TOPO), triphenylphosphate (TOP), thenoyltrifluoroacetone (TTA), crown ethers, and the like. Mixtures of these substances may also be used.

The materials on which the solid extractants are sorbed are conventional chromatographic supports such as styrene-divinylbenzene beads, polyurethane foam, porous glass beads, activated charcoal, solid cellulosic material, fluorocarbon polymers, and the like.

The solutions that can be advantageously processed by the technique of this invention are aqueous solutions of actinides, which contain, along with actinide ions, polymeric plutonium, either fresh or aged. As intimated earlier, while the formation of plutonium polymer is generally carefully avoided, it does form in less acid sites in solution bodies and, once formed, is difficult to extract or destroy by conventional means.

The preferred solid extractant for plutonium polymer has been found to be TOPO. Normally, TOPO would not be expected to extract the polymer, but apparently its basicity is great enough to do so. Extraction with TOPO increases with increasing acid concentration. TOPO combines with the plutonium in a 3:1 ratio.

Although actinides can generally be stripped from the extractants with sodium carbonate solution, it has been found that the plutonium polymer does not strip easily from TOPO. In the present process, therefore, the high capacity loaded sorption material is removed from the column and is either incinerated or acid digested to recover the actinides. Alternately, the column may be rinsed with an organic solvent such as alcohol, ethylene glycol, and the like, to strip the extractant and the actinides from the support. The resulting solution is worked up for actinides in conventional manners.

The following examples are now provided to illustrate the process of the invention in operational detail and are not intended to limit the invention beyond the scope of the appended claims.

EXAMPLE 1

Tri-n-octylphosphine oxide, m.p. 50°–54° C., was used as the solid extractant and Amberlite XAD-4, a macroreticular non-ionic polystyrene-divinylbenzene resin, 20–50 mesh, was used as the solid support. Both materials were obtained commercially.

The resin was conditioned by washing with distilled water, followed by a methanol rinse and drying under vacuum. The extractant was loaded onto the resin by heating together measured amounts of each material (0.362 g/ml resin) to 50° C. in a beaker on a hot plate and slurrying the mixture. The heating was stopped after two hours and the mixture was allowed to stand overnight. The solid extractant was completely absorbed by the resin.

A plutonium feed solution was prepared by appropriate dilution of a plutonium nitrate stock to give about $10^{-3}$ g/l plutonium concentration in 7M $HNO_3$.

An extraction chromatography column was prepared by placing 50 ml of the loaded resin into a 1.8-cm I.D. glass column. Loading of plutonium was effected in an upflow mode at 15 ml/min. Actinide concentrations were determined radiometrically.

The results of this particular process are shown in Table 1.

TABLE 1

Sorption of Plutonium (IV) from 7.4 M $HNO_3$ by TOPO on XAD-4

| Sample | [Pu], g/l |
|---|---|
| Feed | $1.01 \times 10^{-3}$ |
| Effluent (liters) | |
| 0.25 | $3.18 \times 10^{-5}$ |
| 0.50 | $2.54 \times 10^{-5}$ |
| 0.75 | $2.62 \times 10^{-5}$ |
| 1.00 | $2.72 \times 10^{-5}$ |
| 1.25 | $2.69 \times 10^{-5}$ |
| 1.50 | $2.61 \times 10^{-5}$ |
| 1.75 | $3.53 \times 10^{-5}$ |
| 2.00 | $2.70 \times 10^{-5}$ |
| 2.25 | $3.38 \times 10^{-5}$ |
| 2.50 | $2.66 \times 10^{-5}$ |
| 2.75 | $3.46 \times 10^{-5}$ |
| 3.00 | $2.41 \times 10^{-5}$ |
| 3.25 | $3.91 \times 10^{-5}$ |
| 3.50 | $3.02 \times 10^{-5}$ |
| 3.75 | $2.42 \times 10^{-5}$ |
| 4.00 | $2.23 \times 10^{-5}$ |

Total grams Pu = $4.04 \times 10^{-3}$ g
Total grams Pu sorbed = $3.92 \times 10^{-3}$ g (97.2%)
Total grams Pu lost = $1.15 \times 10^{-4}$ g (2.8%)

As the above table figures indicate, excellent separation of dissolved plutonium was achieved at concentration levels that cannot be effectively handled by conventional ion-exchange methods.

EXAMPLE 2

The plutonium absorption capacity of the extractant-support of Example 1 was studied in the following manner:

A column was prepared as in Example 1 and four liters of feed solution prepared with a plutonium concentration of $5.92 \times 10^{-2}$ g/l. The solution was passed through the column, the effluent analyzed for residual plutonium concentration, and the effluent's plutonium was then substantially restored by spiking. The four liters of spiked solution were then passed through the column and, after effluent plutonium concentration determination, the effluent was spiked once more. This process was repeated until a total of 60 liters of solution had passed through the column. The results of this run are shown in Table 2.

TABLE 2

Capacity Test
Sorption of Plutonium (IV) from 7.0 M $HNO_3$ by TOPO on XAD-4

| Sample Volume (liters) | [Pu], g/l, feed | [Pu], g/l, effluent |
|---|---|---|
| 4 | $5.92 \times 10^{-2}$ | $1.75 \times 10^{-4}$ |
| 8 | $4.76 \times 10^{-2}$ | $1.11 \times 10^{-5}$ |
| 12 | $3.70 \times 10^{-2}$ | $2.75 \times 10^{-4}$ |
| 16 | $2.60 \times 10^{-2}$ | $6.82 \times 10^{-4}$ |
| 20 | $2.96 \times 10^{-2}$ | $7.90 \times 10^{-4}$ |
| 24 | $3.23 \times 10^{-2}$ | $7.26 \times 10^{-4}$ |
| 28 | $2.81 \times 10^{-2}$ | $5.97 \times 10^{-4}$ |
| 32 | $2.72 \times 10^{-2}$ | $7.57 \times 10^{-4}$ |
| 36 | $3.21 \times 10^{-2}$ | $5.83 \times 10^{-4}$ |
| 40 | $2.75 \times 10^{-2}$ | $2.29 \times 10^{-4}$ |
| 44 | $3.30 \times 10^{-2}$ | $4.91 \times 10^{-4}$ |
| 48 | $1.44 \times 10^{-2}$ | $4.85 \times 10^{-4}$ |
| 52 | $2.44 \times 10^{-2}$ | $8.54 \times 10^{-4}$ |
| 56 | $4.29 \times 10^{-2}$ | $7.26 \times 10^{-4}$ |
| 60 | $2.90 \times 10^{-2}$ | $6.50 \times 10^{-4}$ |

Total grams Pu = 1.96 g
Total grams Pu sorbed = 1.93 g (98.3%)
Total grams Pu lost = 0.0325 g (1.7%)

As the figures in Table 2 demonstrate, the solid extractant-support material of the invention has a large absorption capacity that is not exhausted after fairly high plutonium loading.

EXAMPLE 3

Octylphenyl-N,N-diisobutylcarbamoylmethylphosphine oxide, 98% pure, was loaded onto the resin used in Example 1 by the same melting and mixing technique. A feed solution containing $10^{-3}$ g Am/l in 7M $HNO_3$ was passed through a 50 ml column packed with the extractant-resin material, an operation which resulted in 99% of the americium being absorbed by the solids. In contrast, when dihexyl-N,N-diethylcarbamoylmethylphosphonate (DHDECMP) is used to extract americium in a liquid-liquid process, only about 50% of the metal ions are extracted and, further, when conventional ion-exchange techniques are resorted to, no americium is recovered.

EXAMPLE 4

In addition to efficient absorption of ionic actinide species as demonstrated in the previous examples, polymeric plutonium is also effectively removed from aqueous solutions by the solid extractant-solid support of the invention. After this has been done, the Pu polymer-loaded material is removed from the column and can be incinerated, leaving the plutonium and other inorganic substances for further fractionation and/or recovery.

As has been established during the course of developing the present invention, its advantages, compared to ion-exchange and solvent extraction processes are as follows: (1) the extractant removes americium and all oxidation states of plutonium, as well as plutonium polymer; (2) when an extractant such as TOPO is used, problems due to acid hydrolysis or radiation damage to materials are minimized; (3) when incineration is employed, solvent clean-up steps and solvent pollution problems are eliminated; (4) the purity of the solvent extractant is not critical since no stripping step is needed; also, back extraction of actinides during recovery is avoided; (5) TOPO is relatively inexpensive and readily available commercially; and (6) the process of the invention yields high recoveries and has a high concentration factor.

The preceding example can be repeated with similar success by substituting the generically or specifically described reactants and/or operating conditions of this invention for those used therein. From the foregoing description, one skilled in the art can easily ascertain the essential characteristics of the invention and, without departing from the spirit and the scope thereof, can make various changes and modifications to adapt it to other usages and conditions.

We claim:

1. A process for removing polymeric plutonium from aqueous solutions, comprising:
   (a) loading a solid solvent extractant on a solid inert support by melting the extractant and mixing it with the support;
   (b) contacting a feed solution containing plutonium polymer with said loaded support to remove the polymer from the solution; and
   (c) recovering the polymer from the loaded support; wherein said solid solvent extractant is selected from the group consisting of trioctylphosphine oxide, octylphenyl-N,N-diisobutylcarbamoylmethylphosphine oxide, triphenylphosphine oxide, thenoyltrifluoruacetone, crown ethers, and mixtures thereof.

2. The process of claim 1, wherein the solid inert support is selected from the group consisting of polystyrenedivinyl-benzene resin, polyurethane foam, porous glass beads and fluorohydrocarbon polymers.

3. The process of claim 1, wherein the extractant selected is trioctylphosphine oxide and the recovery of the absorbed plutonium is done by incinerating the loaded support.

4. The process of claim 1, wherein the feed solution contains other actinide values.

5. The process of claim 4, wherein the feed solution contains americium.

* * * * *